United States Patent Office 3,317,542
Patented May 2, 1967

3,317,542
FLUOROPYRIDINES AND DERIVATIVES
Robert N. Haszeldine, Windyridge, Lyme Road, Disley, England, and Ronald Eric Banks, 187 Kingsway, Burnage, Manchester, England
No Drawing. Filed Mar. 23, 1965, Ser. No. 442,155
Claims priority, application Great Britain, May 11, 1964, 19,612/64
7 Claims. (Cl. 260—290)

This invention is concerned with novel derivatives of pentafluoropyridine and with methods for producing them.

In brief, the present invention provides compounds of the formula:

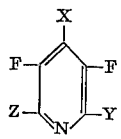

where X is the residue of a reagent capable of effecting nucleophilic attack. Thus X is exemplified by a hydrogen atom, hydroxyl group, a substituted or unsubstituted alkoxy or aryloxy group, a substituted or unsubstituted alkylthio or arylthio group, an amino, alkylamino, or dialkylamino group, or a group of the formula $CR_1R_2R_3$ in which $R_1$ is hydrogen or alkyl, $R_2$ is hydrogen, cyano, amido, carboxy or carboalkoxy and $R_3$ is cyano, amido, carboxy or carboalkoxy; and each of Y and Z is a fluorine atom or X. The groups X, Y and Z, when nucleophilic radicals, may be the same as or different from one another.

It will be understood that the alkyl, alkoxy, aryl, aryloxy, and like groups containing carbon will not be limited as to size, but for practical purpose, these groups will preferably contain from one to about twelve carbon atoms.

In accordance with the present invention, the new compounds are made by nucleophilic attack on pentafluoropyridine. Suitable reagents are those containing negatively charged ions, e.g. substances giving rise to negatively charged hydrogen ions, (e.g. alkali metal hydrides such as sodium hydride), hydroxy ions (e.g. alkali metal hydroxides such as sodium hydroxide), substituted and unsubstituted alkoxy, aryloxy, alkylthio, and arylthio ions, (e.g. alkali metal alkoxides and aryloxides, both substituted and unsubstituted, and the corresponding sulfur compounds i.e. the mercaptan salts), molecules possessing atoms and unshared pairs of electrons such as ammonia, alkylamines, dialkylamines, molecules containing highly polarized or polarizable bonds that can lead to the formation of carbanions, e.g. alkali metal alkylates, arylates and alkenylates and alkyl, aryl and alkenyl Grignard reagents, and compounds of the general formula $(R_1R_2R_3)_nM$ where M is a metal of a metal of valency $n$ and $R_1$, $R_2$ and $R_3$ are as defined above. Reference is made to the text "Organic Chemistry" by R. T. Morrison and R. N. Boyd (Allyn and Bacon, Inc., Boston, Ninth Printing 1963) where at pages 366 to 368 nucleophylic reagents and reactions are discussed and additional examples of nucleophilic reagents are given.

The reaction is accordance with the invention may be carried out in the presnece of a diluent or solvent medium; suitable media include diethyl ether, tetrahydrofuran, dimethylsulphone, alcohols, water and diglyme. In some cases, the reaction mixture may be heated to accelerate the reaction; in other cases, particuraly when powerful nucleophilic reagents are used, the reaction tends to be exothermic and cooling may be necessary. The reaction is not pressure-dependent and is therefore conveniently carried out at atmospheric pressure. The liquid medium will, of course, be inert to the reagents and products.

The molar ratio of the reactants will depend on the degree of substitution required. If equimolar quantities of the nucleophilic reagent and pentafluoropyridine are used, the substitutent will enter the 4-position exclusively. To obtain a 2,4-disubstituted compound, 2 moles of nucleophilic reagent should be used per mole of pentafluoropyridine. To obtain a 2,4,6-trisubstituted 3,5-difluoropyridine, 3 or more moles of nucleophilic reagent should be used per mole of pentafluoropyridine. If different substituents are desired in the 2, 4 and 6 positions, the reaction can be carried out in separate stages, each position being attached in one stage of the reaction, the 4-position first, then the 2-position, and finally the 6-position. It is found in practice that substitution of the 4-position occurs most readily. When a 4-substituent is already present, the next position is less readily attacked and when two substituents are present, the third position is attacked even less readily.

It is extremely unexpected that pentafluoropyridine should be much more reactive towards nucleophilic reagents than hexafluorobenzene because the nitrogen atom in the ring lowers the tendency of the ring carbon atoms to nucleophilic attack. The present invention provides a ready route to a whole range of substituted fluoropyridines. Similarly substituted hexafluorobenzenes are much less easily prepared. The compounds prepared in accordance with the present invention are useful as chemical intermediates and can also be used as insecticides, polymer intermediates, agricultural chemicals, dyestuff intermediates and pharmaceutical intermediates.

Among compounds provided by the invention are the following:

2,3,5,6-tetrafluoro-4-hydroxypyridine,
2,3,5,6-tetrafluoropyridine,
2,3,5,6-tetrafluoro-4-propenylpyridine,
3,5,6-trifluoro-2,4-dipropenylpyridine,
2,3,5,6-tetrafluoro-4-methoxypyridine,
3,5,6-trifluoro-2,6-dimethoxypyridine,
3,5-difluoro-2,4,6-trimethoxypyridine,
2,3,5,6-tetrafluoropyridine-4-carboxylic acid,
2,3,5,6-tetrafluoro-4-phenylpyridine,
3,5,6-trifluoro-2,4-dihydroxypyridine,
4-methylamino-2,3,5,6-tetrafluoropyridine,
2,4-bis(dimethylamino)-3,5,6-trifluoropyridine, and
2,3,5,6-tetrafluoro-4-hydrazinopyridine.

2,3,5,6-tetrafluoro-4-hydroxypyridine is an acidic compound. It has a characteristic phenolic odor and reddens moist blue litmus paper. It liberates carbon dioxide briskly from cold aqueous sodium bicarbonate solution and darkens ferric chloride solution. Its dissociation constant, determined by potentiometric titration of 0.005 N solution in carbonate-free distilled water against aqueous sodium hydroxide, gave at pKa of 3.21.

It may be noted that certain of the compounds provided can be converted by other routes to other compounds in accordance with the invention. For example, 2,3,5,6-tetrafluoro-4-hydroxypyridine can be converted to 2,3,5,6-tetrafluoro-4-methoxypyridine by reaction with diazomethane; 2,3,5,6-tetrafluoropyridine-4-carboxylic acid can be decarboxylated to produce 2,3,5,6-tetrafluoropyridine; 2,3,5,6-tetrafluoro-4-hydrazinopyridine can be converted to 2,3,5,6-tetrafluoropyridine by reaction with copper sulphate; the anilinium derivative of 2,3,5,6-tetrafluoro-4-hydroxypyridine may be obtained by reacting that compound with aniline; 2,3,5,6-tetrafluoropyridine-4-carboxylic acid can be reacted with S-benzylthiouronium chloride to produce its S-benzylthiouronium derivative; 2,3,5,6-tetrafluoro-4-hydrazinopyridine can be converted to 2,3,5, 6-tetrafluoro-4-phenylpyridine by treatment with bleaching powder and benzene. These various reactions are to be understood as falling within the scope of the present invention.

The invention will now be illustrated by the following examples, in which the structural formulae of all the compounds were determined by $^{19}$F nuclear magnetic resonance spectroscopy. The words "Pyrex" and "Celite" used in the examples are trademarks; all temperatures are on the centigrade scale. Pentafluoropyridine is obtained by passing undecafluoropiperidine through a heated tube in accordance with the procedures set forth in co-pending application Ser. No. 95,476, filed Mar. 14, 1961 in the names of Haszeldine, Banks and Ginsberg, now U.S. Patent No. 3,232,946.

EXAMPLE 1

*2,3,5,6-tetrafluoro-4-hydroxypyridine*

Pentafluoropyridine (1.45 g., 8.58 millimoles), sodium hydroxide (0.72 g., 18.00 millimoles), and water (12 ml.) were heated under reflux for 2 hours. The homogeneous product was acidified with concentrated hydrochloric acid (3 ml.) and extracted with ether (3×25 ml.). The ethereal extract was dried (MgSO$_4$), then evaporated to give a white solid that was sublimed at 60° and less than 1 mm. to yield 2,3,5,6,-tetrafluoro-4-hydroxypyridine (0.83 g., 58%) M.P. 73–75°, $\lambda_{max.}$ 255 m$\mu$ ($\epsilon$ 1790), $\lambda_{min.}$ 228 m$\mu$ ($\epsilon$ 220) in hexane, $\lambda_{max.}$ 243 m$\mu$ ($\epsilon$ 2270), $\lambda_{infl.}$ 264–270 m$\mu$ ($\epsilon$ 850–730), $\lambda_{min.}$ 230 m$\mu$ ($\epsilon$ 1950) in ethanol. The infrared spectrum of 2,3,5,6-tetrafluoro-4-hydroxypyridine (mull) shows a strong ring vibration frequency at 1481 cm.$^{-1}$.

*Analysis.*—Found: C, 36.3; H, 0.7; N, 8.1%; equiv., 167. C$_5$HF$_4$NO requires C, 35.9; H, 0.6; N, 8.4%; equiv., 167.

EXAMPLE 2

*2,3,5,6-tetrafluoro-4-hydroxypyridine*

Pentafluoropyridine (1.94 g., 117.50 millimoles), potassium hydroxide (1.57 g., 28.00 millimoles), and t-butanol (30 ml.) were heated under reflux for 2.5 hours. The product was cooled to room temperature and treated with water (50 ml.). The t-butanol was removed by distillation, and the aqueous solution was acidified (5 N HCl, 15 ml.) and extracted with ether (4×20 ml.). The ethereal extract was dried (MgSO$_4$), then evaporated to give a white solid that was sublimed at 60° and less than 1 mm. to yield 2,3,5,6-tetrafluoro-4-hydroxypyridine (1.22 g., 64%), M.P. 73–75°.

EXAMPLE 3

*Anilinium derivative of 2,3,5,6-tetrafluoro-4-hydroxypyridine*

Ether was added dropwise to a slurry of tetrafluoro-4-hydroxypyridine (0.20 g., 1.20 millimoles) in n-hexane (4 ml.) until a homogeneous solution formed. This solution was then treated with an ethereal solution of aniline and the resulting white precipitate was recrystallized from n-hexane to yield the anilinium derivative of 2,3,5,6-tetrafluoro-4-hydroxypyridine (0.18 g., 58%), M.P. 132°.

*Analysis.*—Found: C, 51.0; H, 3.1; N, 10.7%.

C$_{11}$H$_8$F$_4$N$_2$O requires C, 50.8; H, 3.1; N, 10.8%.

EXAMPLE 4

*2,3,5,6-tetrafluoro-4-methoxypyridine*

A mixture of pentafluoropyridine (3.0 g., 17.7 millimoles) and 0.51 N sodium methoxide in anhydrous methanol (35 ml., 17.7 millimoles) was heated under reflux for 3 hours. The product was treated with water (50 ml.) and extracted with ether (4×30 ml.). The ethereal extract was dried (MgSO$_4$) and distilled to yield 2,3,5,6-tetrafluoro-4-methoxypyridine (1.8 g., 56%) B.P. 68°/30 mm. $n_D^{20}$ 1.4167, $d_4^{20}$ 1.493, $\lambda_{max.}$ 215 ($\epsilon$ 4920) and 259 m$\mu$ ($\epsilon$ 2120) in hexane, $\lambda_{max.}$ 218 ($\epsilon$ 5780) and 258 m$\mu$ ($\epsilon$ 2020) in ethanol.

*Analysis.*—Found: C, 40.0; H, 1.6; N, 7.8%.

C$_6$H$_3$F$_4$NO requires C, 39.8; H, 1.7; N, 7.7%.

In a duplicate experiment where the reactants were shaken together at room temperature for 10 minutes, 4-methoxytetrafluoropyridine was obtained in 66% yield.

EXAMPLE 5

*2,3,5,6-tetrafluoro-4-methoxypyridine*

A solution of 4-hydroxytetrafluoropyridine (0.20 g., 1.20 millimoles) in ether (2 ml.) was treated with a 5% excess of diazomethane in ether at 0°. The mixture was allowed to warm up slowly to 20°, and ether was removed by distillation. The residual oil was distilled under reduced pressure in a micro Vigreux still, to yield 2,3,5,6-tetrafluoro-4-methoxypyridine (0.6 g., 67%), B.P. 68° at 30 mm.

*Analysis.*—Found: C, 40.0; H, 1.6; N, 7.8%.

C$_6$H$_3$F$_4$NO requires C, 39.8; H, 1.7; N, 7.7%.

EXAMPLE 6

*2,3,5,6-tetrafluoro-4-propenylpyridine*

A 100-ml. three-necked flask was fitted with a mercury-sealed stirrer, a dropping funnel, and a thermometer (−80° to 30°), the whole apparatus was flushed with dry nitrogen for 1 hour, and the flow of nitrogen was maintained throughout the experiment. A solution of pentafluoropyridine (3.33 g., 19.70 millimoles) in dry ether (10 ml.) was placed in the flask, which was then cooled to −20°. A solution of propenyl-lithium (0.87 g., 18.10 millimoles) in dry ether (10 ml.) was added from the dropping funnel during 1.5 hours. The reaction mixture was allowed to warm up slowly to room temperature and poured into 0.5 N HCl (50 ml.). The organic layer was separated and the aqueous layer was extracted with ether (2×20 ml.). The ethereal extract and the organic layer were combined, dried (MgSO$_4$), and distilled to remove the ether. The distillation residue was fractionated in a small Vigreux still to yield a mixture of cis- and trans- 2,3,5,6-tetrafluoro-4-propenylpyridine (2.5 g., 66%) B.P. 54°/10 mm. Gas-liquid chromatographic analysis (2 m. 30% s./w. Silicone MS550/Celite at 143°) revealed that the cis:trans ratio was 6:1.

*Analysis.*—Found: C, 50.2; H, 2.3; N, 7.3%.

C$_8$H$_5$F$_4$N requires C, 50.3; H, 2.6; N, 7.3%.

EXAMPLE 7

*3,5,6-trifluoro-2,4-dipropenylpyridine*

The above experiment was repeated using a 1:2 molar ratio of pentafluoropyridine to propenyl-lithium. A solution of propenyl lithium (2.76 g., 58.00 millimoles) in ether (190 ml.) was added to a solution of pentafluoropyridine (4.85 g., 28.70 millimoles) in dry ether (15 ml.) at −20° during 2.5 hours. The production was worked up as before to yield 3,5,6-trifluoro-2,4-dipropenylpyridine (3.6 g., 62%) B.P. 91–92°/5 mm. Gas-liquid chromatographic analysis (1 m. 30% w./w. Silicone MS 550/Celite at 180°) revealed the presence of four isomers (peak area ratio 66:20:10:2).

*Analysis.*—Found: C, 61.9; H, 4.7; N, 6.4%. C$_{11}$H$_{10}$F$_3$N requires C, 62.0; H, 4.7; N, 6.6%.

EXAMPLE 8

*3,5,6-trifluoro-2,4-dimethoxypyridine*

A mixture of 4-methoxytetrafluoropyridine (2.6 g., 14.4 millimoles), prepared by the procedure of Example 4, and 0.53 N sodium methoxide in methanol (28.0 ml., 14.8 millimoles) was heated under reflux for 4 hours. Water (60 ml.) was added to the product, and the mixture was extracted with ether (4×30 ml.) Distillation of the ethereal extract (dried over MgSO$_4$) gave 3,5,6-trifluoro-2,4-dimethoxypyridine (1.9 g., 69%) B.P. 87–88° at 15 mm., $n_D^{20}$ 1.4532, $d_4^{20}$ 1.4240, $\lambda_{max.}$ 271 m$\mu$ ($\epsilon$3860), $\lambda_{infl.}$ 204–216 m$\mu$ ($\epsilon$9460–4820) in hexane, $\lambda_{max.}$ 270 m$\mu$ ($\epsilon$3790), $\lambda_{infl.}$ 204–214 m$\mu$ ($\epsilon$9600–5200) in ethanol, which was GLC pure (2 m. 30% w./w. didecyl phthalate/Celite at 168°).

*Analysis.*—Found: C, 43.5; H, 3.0; N, 7.5%. C$_7$H$_6$F$_3$NO$_2$ requires C, 43.5; H, 3.1; N, 7.5%.

EXAMPLE 9

*3,5-difluoro-2,4,6-trimethoxypyridine*

A mixture of pentafluoropyridine (1.9 g., 11.2 millimoles) and 1.54 N sodium methoxide in methanol (39.0 ml., 60.0 millimoles) was heated under reflux for 6 hours. The product was cooled to 20° and water (50 ml.) was added. A white solid precipitated and was filtered, washed with water, dried over P$_2$O$_5$ in vacuo, and sublimed at 40° at less than 1 mm. to yield 3,5-difluoro-2,4,6-trimethoxypyridine (1.7 g., 74%) M.P. 50–54°, $\lambda_{max.}$ 279 m$\mu$ ($\epsilon$5750), $\lambda_{infl.}$ 226–233 m$\mu$ ($\epsilon$2230–1520) in hexane, $\lambda_{max.}$ 281 m$\mu$ ($\epsilon$5550), $\lambda_{infl.}$ 225–233 m$\mu$ ($\epsilon$2310–1530) in ethanol. The aqueous filtrate was titrated against N—HCl and found to contain 26.4 millimoles of unreacted base.

*Analysis.*—Found: C, 46.9; H, 4.3; N, 7.1%. C$_8$H$_9$F$_2$NO$_3$ requires C, 46.8; H, 4.4; N, 6.8%.

EXAMPLE 10

*3,5-difluoro-2,4,6-trimethoxypyridine*

A mixture of 2,4-dimethoxytrifluoropyridine (0.86 g., 4.46 millimoles) prepared by the procedure of Example 7, and 0.78 N sodium methoxide in methanol (6.0 ml., 4.68 millimoles) was heated under reflux for 6 hours. The product was cooled (20°) and treated with water (10 ml.), whereupon a white waxy solid separated. The solid was filtered, washed with water, dried over P$_2$O$_5$ in vacuo, and sublimed at 40° at less than 1 mm. to yield 3,5-difluoro-2,4,6-trimethoxypyridine (0.76 g., 83%) M.P. 48–52°.

*Analysis.*—Found: C, 46.9; H, 4.2; N, 7.1%. C$_6$H$_9$F$_2$NO$_3$ requires C, 46.8; H, 4.4; N, 6.8%.

EXAMPLE 11

*3,5,6-trifluoro-2,4-dihydroxypyridine*

Pentafluoropyridine (1.0 g.) and 40% aqueous sodium hydroxide solution (5 ml.) were heated in 20-ml. Pyrex ampoule at 80° for 12 hours. Ammonia was detected by its characteristic odour when the ampoule was opened. The solid product was washed out of the ampoule with water (50 ml.), and the resulting solution gave positive tests for F$^-$ and NH$_4^+$. The solution was acidified (conc. HCl, 6 ml.), filtered to remove silicic acid, and the filtrate was extracted with ether (4×25 ml.). Evaporation of the dry (MgSO$_4$) ethereal extract gave a white solid that was recrystallized from water to yield 3,5,6-trifluoro-2,4-dihydroxypyridine (0.2 g., 20%) as white needles M.P. 188°.

*Analysis.*—Found: C, 36.4; H, 1.2%. C$_5$H$_2$F$_4$NO$_2$ requires C, 36.4; H, 1.2%.

EXAMPLE 12

*2,3,5,6-tetrafluoro-4-hydrazinopyridine*

Pentafluoropyridine (5.0 g., 30 millimoles), hydrazine hydrate (3.6 g., 72 millimoles), and ethanol (65 ml.) were mixed at 0°; a white precipitate of hydrazine hydrofluoride formed immediately. The mixture was stirred at 0° for 2 hours, then filtered to remove hydrofluoride (1.5 g., 30 millimoles); the filtrate was evaporated, in vacuo, and the residue was sublimed at 70°/10$^{-2}$ mm. to yield 2,3,5,6-tetrafluoro-4-hydrazinopyridine. (4.0 g., 75%) as a white solid, M.P. 56.5°, $\lambda_{max.}$ 238 m$\mu$ ($\epsilon$10200), $\lambda_{min.}$ 218 m$\mu$ ($\epsilon$3840) in hexane, $\lambda_{max.}$ 248 m$\mu$ ($\epsilon$13400), $\lambda_{min.}$ 224 m$\mu$ ($\epsilon$3930) in ethanol.

*Analysis.*—Found: C, 33.4; H, 1.8; N, 23.4%. C$_5$H$_3$F$_4$N$_3$ requires C, 33.2; H, 1.7; N, 23.2%.

EXAMPLE 13

*4-dimethylamine-2,3,5,6-tetrafluoropyridine*

An exothermic reaction occurred when a cold (0°) mixture of 25% w./w. aqueous dimethylamine solution (1.8 g., 10 millimoles) with ethanol (2.5 g.) was added to a stirred solution of pentafluoropyridine (0.80 g., 4.73 millimoles) in ethanol (2.5 g.) at 0°. When the reaction mixture was cooled to 0°, 4-dimethylamine-2,3,5,6-tetrafluoropyridine (0.47 g., 51%) precipitated as a white, crystalline solid, M.P. 23.5°, B.P. 85°/3 mm.

*Analysis.*—Found: C, 43.3; H, 3.4; N, 14.4%. C$_7$H$_6$F$_4$N$_2$ requires C, 43.3; H, 3.1; N, 14.4%.

EXAMPLE 14

*2,3,5,6-tetrafluoro-4-phenylpyridine*

2,3,5,6-tetrafluoro-4-hydrazinopyridine (4.6 g.) in sodium dried benzene (100 ml.) was added during 3 hours to a stirred suspension of bleaching powder (25 g.) in sodium-dried benzene (200 ml.) at 20°. Nitrogen (520 ml., 84.5%) was evolved. The product was filtered and the filtrate was evaported at 25 mm. pressure, leaving a black crystalline residue (1.0 g.) that was sublimed at 40° at less than 1 mm. to yield 2,3,5,6-tetrafluoro-4-phenylpyridine as a white solid, M.P. 102–103°.

*Analysis.*—Found: C, 58.4; H, 1.9; N, 6.3%. C$_{11}$H$_5$F$_4$N requires C, 58.2; H, 2.2; N, 6.2%; M, 227.

EXAMPLE 15

*2,3,5,6-tetrafluoropyridine*

To a cold (0°), stirred solution of pentafluoropyridine (4.0 g., 23.7 millimoles) in ether (10 ml.) was added 0.23 N lithium aluminium hydride in ether (106 ml.) cooled to 0°. On completion of the addition (1 hour), the reaction mixture was heated under reflux (4 hours) then cooled (0°) and treated with undried ether (2 ml.) and 2 N H$_2$SO$_4$ (10 ml.). The ethereal layer was distilled through a 20×1 cm. i.d. adiabatic column packed with ⅟₁₆″×⅟₁₆″ nickel Dixon rings until only ca. 4 ml. of distilland remained; this was fractioned by trap-to-trap fractional condensation in vacuo, to yield a colourless liquid (3.2 g.) that was shown by gas-liquid chromatography (2 m. 30% w./w. paraffin oil/Celite at 100°) to contain pentafluoropyridine (18%) and one other compound (82%). This other compound was isolated by large-scale gas-liquid chromatography (3 m.×2.2 cm. 30% w./w. Silicone oil/Celite at 110°) and shown by elemental analysis and infrared and $^{19}$F NMR spectroscopy to be 2,3,5,6-tetrafluoropyridine B.P. 102°. The yield of this tetrafluoropyridine, calculated from chromatographic data, was 74%. 2,3,5,6-tetrafluoropyridine vapour shows a characteristic ring vibration frequency in the infrared at 1497 cm.$^{-1}$.

*Analysis.*—Found: C, 40.2; H, 0.8; N, 9.3%; M, 152. C$_5$HF$_4$N requires C, 39.9; H, 0.7; N, 9.3%; M, 151.

EXAMPLE 16

*2,3,5,6-tetrafluoropyridine*

Copper sulphate (19.0 g., 75 millimoles) in water (50 ml.) was added during 1.5 hour to a stirred suspension of 2,3,5,6-tetrafluoro-4-hydrazinopyridine (4.0 g., 22.6 millimoles) obtainable by the procedure of Example 12, in water (50 ml.) at 20°; reaction was instantaneous with liberation of nitrogen. After the addition was complete the reaction mixture was boiled under reflux for 2 hours and then steam-distilled to yield a yellow oil. This oil was dried (P$_2$O$_5$) and distilled in a micro Vigreux still to yield 2,3,5,6-tetrafluoropyridine (1.8 g., 54%) B.P.

102° which was identified by gas-liquid chromatography as well as by infrared and $^{19}$F NMR spectroscopy. A total of 400 ml. 80%) of nitrogen was evolved in the reaction.

EXAMPLE 17

*2,3,5,6-tetrafluoropyridine-4-carboxylic acid*

2,3,5,6-tetrafluoro-4-propenylpyridine (1.2 g., 6.3 millimoles) prepared by the procedure of Example 6 and concentrated nitric acid (5 ml.) were heated in a 25-ml. Pyrex ampoule at 110° for 45 min. The product, a homogeneous dark green liquid, was poured into a mixture of crushed ice and water (ca. 100 g.) and the resulting colourless solution was extracted with ether (8×25 ml.). The ethereal extract was dried (MgSO$_4$) and then evaporated to give a pale-yellow solid, which was sublimed at 70° at less than 1 mm. to yield 2,3,5,6-tetrafluoropyridine-4-carboxylic acid (0.4 g., 33%) M.P. 98–100°.

*Analysis.*—Found: C, 36.9; H, 0.5; N, 7.1%. C$_6$HF$_4$NO$_2$ requires C, 36.9; H, 0.5; N, 7.2%.

EXAMPLE 18

*2,3,5,6-tetrafluoropyridine*

2,3,5,6-tetrafluoropyridine-4-carboxylic acid (0.10 g., 0.52 millimole) obtainable by the procedure of Example 17, was heated in an evacuated 15-ml. Pyrex ampoule at 250° for 1 hour. The volatile product was transferred to a vacuum system, leaving behind a black residue, and separated by fractional condensation in vacuo into carbon dioxide (0.02 g., −196° trap) and 2,3,5,6-tetrafluoropyridine (0.06 g., 0.40 millimole; 77%, −78° trap) which was spectroscopically (infrared) identical with the compound obtained from the reaction of pentafluoropyridine with lithium aluminum hydride as described in Example 15.

*Analysis.*—Found: C, 40.0; H, 1.0; N, 9.1%, M 154. Calc. for C$_5$HF$_4$N: C, 39.9; H, 0.7; N, 9.3; M 151.

EXAMPLE 19

*S-benzylthiouronium derivative of 2,3,5,6-tetrafluoropyridine 4-carboxylic acid*

A solution of 2,3,5,6-tetrafluoropyridine-4-carboxylic acid (1.10 g.) in water (3 ml.) was treated with dilute aqueous sodium hydroxide solution until the pH was 4, when an aqueous solution of S-benzylthiouronium chloride was added. The resulting white precipitate was recrystallized from water to give the S-benzylthiouronium derivative of 2,3,5,6-tetrafluoropyridine 4-carboxylic acid (0.12 g., 65%) M.P. 148°.

*Analysis.*—Found: C, 46.3; H, 3.1; N, 11.7%. C$_{14}$H$_{11}$F$_4$N$_3$O$_2$S requires, C, 46.5; H, 3.0; N, 11.6%.

EXAMPLE 20

*2,4-bis(dimethylamino)-3,5,6-trifluoropyridine*

A mixture of pentafluoropyridine (1.0 g., 5.9 millimoles), 25% 3/3 aqueous dimethylamine solution (2.8., 15.5 millimoles), and ethanol (2.5 g.) was heated in a 10-ml. Pyrex ampoule at 100° for 20 hours. When the ampoule was cooled to 20° a white solid (1.0 g.) precipitated; this was filtered and sublimed in vacuo to give 2,4-bis(dimethylamino)-3,5,6-trifluoropyridine M.P. 35–38°.

*Analysis.*—Found: C, 50.0; H, 5.7: N, 20.1%. C$_9$H$_{12}$F$_3$N$_3$ requires C, 49.3; H, 5.5; N, 19.2%.

We claim:
1. 2,3,5,6-tetrafluoro-4-propenylpyridine.
2. 3,5,6-trifluoro-2,4-dipropenylpyridine.
3. 3,5,6-trifluoro-2,4-dimethoxypyridine.
4. 3,5-difluoro-2,4,6-trimethoxypyridine.
5. 2,3,5,6-tetrafluoro-4-dimethylaminopyridine.
6. 2,3,5,6-tetrafluoropyridine-4-carboxylic acid.
7. 2,4-bis(dimethylamino)-3,5,6-trifluoropyridine.

References Cited by the Examiner

Chem. Abstracts I, volume 43, par. 642, (1949).
Houben-Wehl: Meth. Org. Chem., Halogen Verbindungen, V–3, page 727, Verlag, 1962.
Chem. Abstracts II, volume 55, par. 18,769, (1961).
Chambers et al. (I), Proc. Chem. Soc., London, March (1964), page 83.
Chambers et al.: (II), Un. v. Science Labs., Durham, England, pages 3736–9, abstracted by Che. Abstracts, vol. 61, par. 14,633 (1964).

WALTER A. MODANCE, *Primary Examiner.*
ALAN L. ROTMAN, *Assistant Examiner.*

UNITED STATES PATENT OFFICE
CERTIFICATE OF CORRECTION

Patent No. 3,317,542                        May 2, 1967

Robert N. Haszeldine et al.

It is hereby certified that error appears in the above numbered patent requiring correction and that the said Letters Patent should read as corrected below.

Column 1, line 65, for "presnece" read -- presence --; column 3, line 39, for "117.50" read -- 11.50 --; column 4, line 37, for "10 ml." read -- 19 ml. --; column 4, line 63, for "production" read -- product --; column 5, line 63, for the formula reading "$C_5H_2F_4NO_2$" read -- $C_5H_2F_3NO_2$ --; line 73, after" remove" insert -- hydrazine --; column 7, line 3, for "400 ml. 80%)" read -- 400 ml. (80%) --; column 8, line 14, for "2.8.," read -- 2.8 g.,--.

Signed and sealed this 7th day of November 1967.

(SEAL)
Attest:

Edward M. Fletcher, Jr.
Attesting Officer

EDWARD J. BRENNER
Commissioner of Patents